US006944346B2

(12) United States Patent
Van Der Schaar

(10) Patent No.: US 6,944,346 B2
(45) Date of Patent: Sep. 13, 2005

(54) EFFICIENCY FGST FRAMEWORK EMPLOYING HIGHER QUALITY REFERENCE FRAMES

(75) Inventor: Mihaela Van Der Schaar, Ossining, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 660 days.

(21) Appl. No.: 10/156,410

(22) Filed: May 28, 2002

(65) Prior Publication Data

US 2003/0223643 A1 Dec. 4, 2003

(51) Int. Cl.[7] .............................................. G06K 9/36
(52) U.S. Cl. ..................................... 382/236; 382/238
(58) Field of Search ................................ 382/232, 236, 382/238, 240; 375/240.11, 240.03, 244; 348/416.1, 699; 358/463, 447, 553

(56) References Cited

U.S. PATENT DOCUMENTS

| | | | | |
|---|---|---|---|---|
| 5,508,823 A | * | 4/1996 | Kiyohara et al. | 358/463 |
| 5,612,744 A | * | 3/1997 | Lee et al. | 348/416.1 |
| 5,818,974 A | * | 10/1998 | Kimura et al. | 382/270 |
| 6,181,822 B1 | * | 1/2001 | Miller et al. | 382/232 |
| 6,263,022 B1 | * | 7/2001 | Chen et al. | 375/240.03 |
| 2002/0037046 A1 | | 3/2002 | Schaar et al. | |

FOREIGN PATENT DOCUMENTS

WO    WO0205563    1/2002    ............ H04N/7/30

OTHER PUBLICATIONS

Wu et al., "Progressive Fine Granular Scalable (PFGS) Video Using Advanced Predicted Bitplane Coding (APBIC)", IEEE, vol. 5, May 2001, pps. 97–100.*

Buchner et al., "Progressive Texture video Coding", IEEE, vol. 3, May 2001, pps. 1813–1816.*

"Macroblock–based progressive fine granularity scalable–temporal (PFGST) video coding" by Sun et al., Jan. 2001, Microsoft Research China.

* cited by examiner

Primary Examiner—Anh Hong Do

(57) ABSTRACT

A method and apparatus for coding video includes constructing motion-compensated extended reference frames from at least portions of temporal residual image frames. The motion-compensated extended reference frames are used for bi-directionally and/or uni-directionally predicting additional levels of FGS motion-compensated residual image or temporal frames.

32 Claims, 5 Drawing Sheets

EFFICIENCY FGST FRAMEWORK EMPLOYING HIGHER QUALITY REFERENCE FRAMES

RELATED APPLICATIONS

Commonly-assigned, copending U.S. patent application Ser. No. 09/590,825, entitled "Hybrid Temporal-SNR Fine Granular Scalability Video Coding", filed Jun. 9, 2000.

Commonly-assigned, copending U.S. patent application Ser. No. 09/930,672 entitled "Totally Embedded FGS Video Coding With Motion Compensation", filed Aug. 15, 2001.

Commonly-assigned, copending U.S. patent application Ser. No. 10/090,863 entitled "Improved Efficiency FGST Framework Employing Higher Quality Reference Frame", filed Mar. 4, 2002.

FIELD OF THE INVENTION

The present invention relates to fine granular scalability (FGS) video coding, and more particularly, to an FGS coding scheme where multiple layers of bi-directional and/or uni-directional predicted FGS temporal (FGST) frames are predicted from higher quality reference frames that include Base Layer information and at least a portion of Enhancement Layer information.

BACKGROUND OF THE INVENTION

Video streaming over Internet Protocol (IP) networks has enabled a wide range of multimedia applications. Internet video streaming provides real-time delivery and presentation of continuous media content while compensating for the lack of Quality-of-Service (QoS) guarantees over the Internet. Due to the variation and unpredictability of bandwidth and other performance parameters (e.g., packet loss rate) over IP networks, in general, most of the proposed streaming solutions are based on some type of a layered (or scalable) video coding scheme.

FIGS. 1A and 1B illustrate exemplary scalability structures 10A, 10B of one type of scalable video coding scheme known as hybrid temporal-SNR Fine Granular Scalability (FGS HS), as described in detail in earlier mentioned commonly assigned, copending U.S. patent application Ser. No. 09/590,825. Each FGS HS structure 10A, 10B includes a Base Layer 11A, 11B (BL) and an Enhancement Layer 12A, 12B (EL). The BL part of a scalable video stream represents, in general, the minimum amount of data needed for decoding that stream. The EL part of the stream represents additional information, i.e., FGS SNR frames or pictures and FGS temporal frames or pictures (denoted FGST), that enhances the video signal representation when decoded by the receiver. In particular, the additional temporal frames are introduced to obtain a higher frame-rate. The MPEG-4 FGS standard supports both the bi-directional predicted FGST picture type of FIG. 1A and the forward-predicted FGST picture type of FIG. 1B.

FIG. 2 illustrates the functional architecture of an exemplary FGS HS video encoder 100 as described in U.S. patent application Ser. No. 09/590,825. The encoding operation is based on a DCT transform, although other transforms (e.g. wavelet) can also be used. This video encoder 100 is capable of generating the FGS HS structures 10A, 10B of FIGS. 1A and 1B. The video encoder 100 comprises a BL encoder 110 and an EL encoder 130. The video encoder 100 receives an original video signal which is processed into a BL bit stream of I and P frames by the BL encoder 110 and into an EL bit stream of FGS SNR I and P frames and/or P and B FGST frames by the EL encoder 130.

In the FGS HS structures of FIGS. 1A and 1B, the FGST frames are predicted from low-quality base-layer reference frames stored in the frame memory block. Consequently, the resulting motion-compensated residual error is high, thus requiring a large number of bits for compressing these frames. Accordingly, the transition to a higher frame-rate is performed at either low bit-rates or very high bit-rates.

Accordingly, a technique is needed that lowers the bandwidth required for introducing FGST frames in a FGS HS video coding scheme.

SUMMARY OF THE INVENTION

A first aspect of the present invention is directed to video coding. This aspect involves constructing motion-compensated extended reference frames from at least portions of first level motion-compensated residual image frames. A second level of motion-compensated residual image frames are predicted from the motion-compensated extended reference frames and the video. The second level motion-compensated residual image frames are fine granular scalable coded into a data-stream of temporal frames.

A second aspect of the present invention is directed to video decoding. This aspect involves constructing motion-compensated extended references from at least portions of first level motion-compensated residual image frames. A second level temporal frame portion of the enhancement layer data-stream is fine granular scalable decoded to construct second level of motion-compensated residual frames. The motion-compensated extended reference frames are combined with the second level motion-compensated residual frames to construct second level temporal frames.

BRIEF DESCRIPTION OF THE DRAWINGS

The advantages, nature, and various additional features of the invention will appear more fully upon consideration of the illustrative embodiments now to be described in detail in connection with accompanying drawings where like reference numerals identify like elements throughout the drawings.

DETAILED DESCRIPTION

Figure 3A:
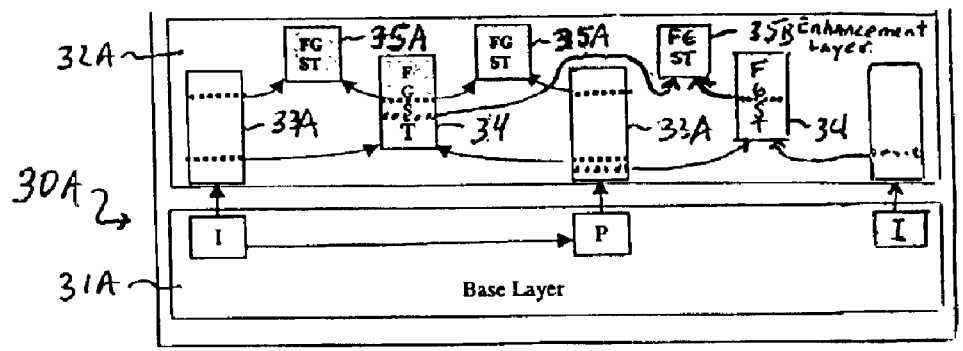
FIG. 3A is a diagram illustrating an FGS-based hybrid temporal-SNR scalability structure according to a first exemplary embodiment of the present invention.

FIG. 3A illustrates an FGS-based hybrid temporal-SNR scalability structure (FGS HS structure 30A) according to a first exemplary embodiment of the present invention. The FGS HS structure 30A includes a BL 31A coded with I and P frames and a single EL 32A FGS coded with residual SNR I and P frames and at least first and second levels of motion-compensated residual or temporal (FGST) bi-directionally predicted (B) frames 34, 35A, and 35B.

The first level FGST frame 34 is bi-directionally predicted from high quality "extended" BL reference frames that are each constructed from an entire BL frame and at least a portion of EL frame, i.e., one or more bit-planes or fractional bit-planes of the EL frame. The second level FGST frames 35A may be bi-directionally predicted from high quality extended BL reference frames, and a high quality "extended" FGST reference frame, i.e., one or more bit-planes or fractional bit-planes of the FGST frame 34. The second level FGST frames 35B may be bi-directionally predicted from at least portions of two different high quality extended FGST reference frames.

Figure 3B:
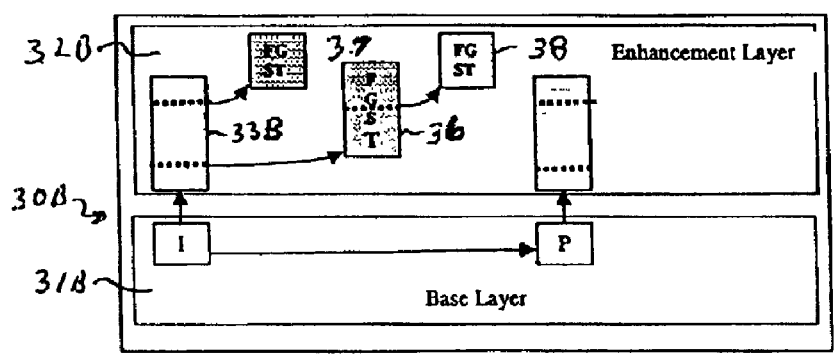
FIG. 3B is a diagram illustrating an FGS-based hybrid temporal-SNR scalability structure according to a second exemplary embodiment of the present invention.

FIG. 3B illustrates an FGS hybrid temporal-SNR scalability structure (FGS HS structure 30B) according to a second exemplary embodiment of the present invention. The FGS HS structure 30B includes a BL 31B coded with I and P frames and a single EL 32B FGS coded with residual SNR I and P frames and at least first and second levels of motion-compensated residual or temporal (FGST) uni-directionally predicted (B) frames 36, 37, and 38.

The first level FGST frame 36 is uni-directionally predicted from a high quality extended BL reference frame derived from at least a portion of SNR frame 33B. The second level FGST frame 37 is also uni-directionally predicted from at least a portion of this high quality extended BL reference frame. The second level FGST frame 38 is uni-directionally predicted from a high quality extended FGST reference frame, i.e., at least a portion of first level FGST frame 36.

Figure 1A:
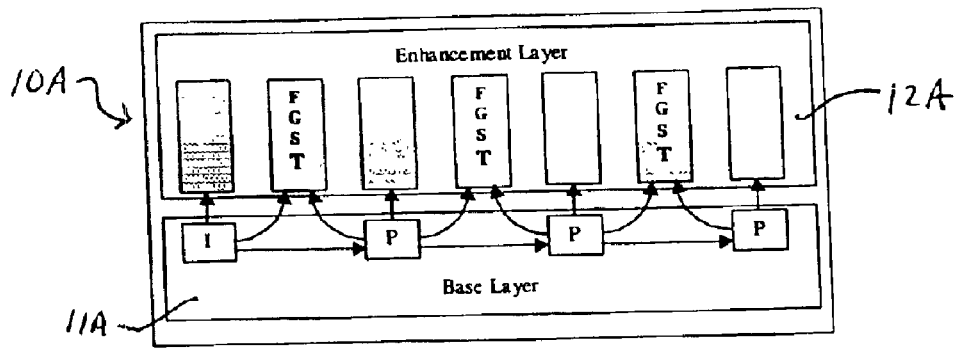
FIGS. 1A and 1B are diagrams illustrating exemplary scalability structures of a scalable video coding scheme known as hybrid temporal-SNR Fine Granular Scalability.
Figure 1B:
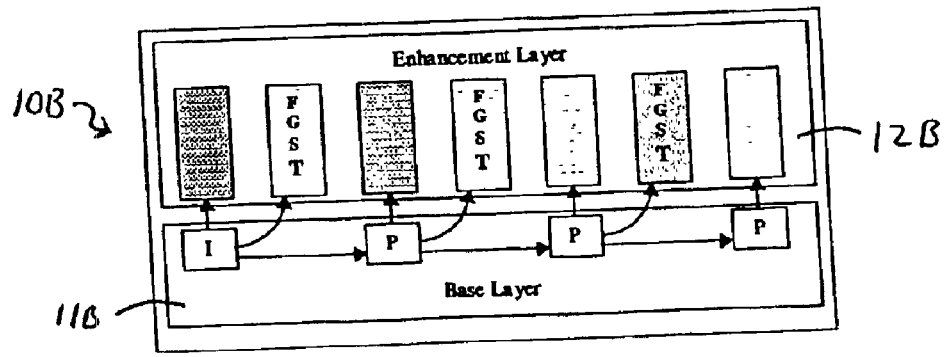
Figure 2:
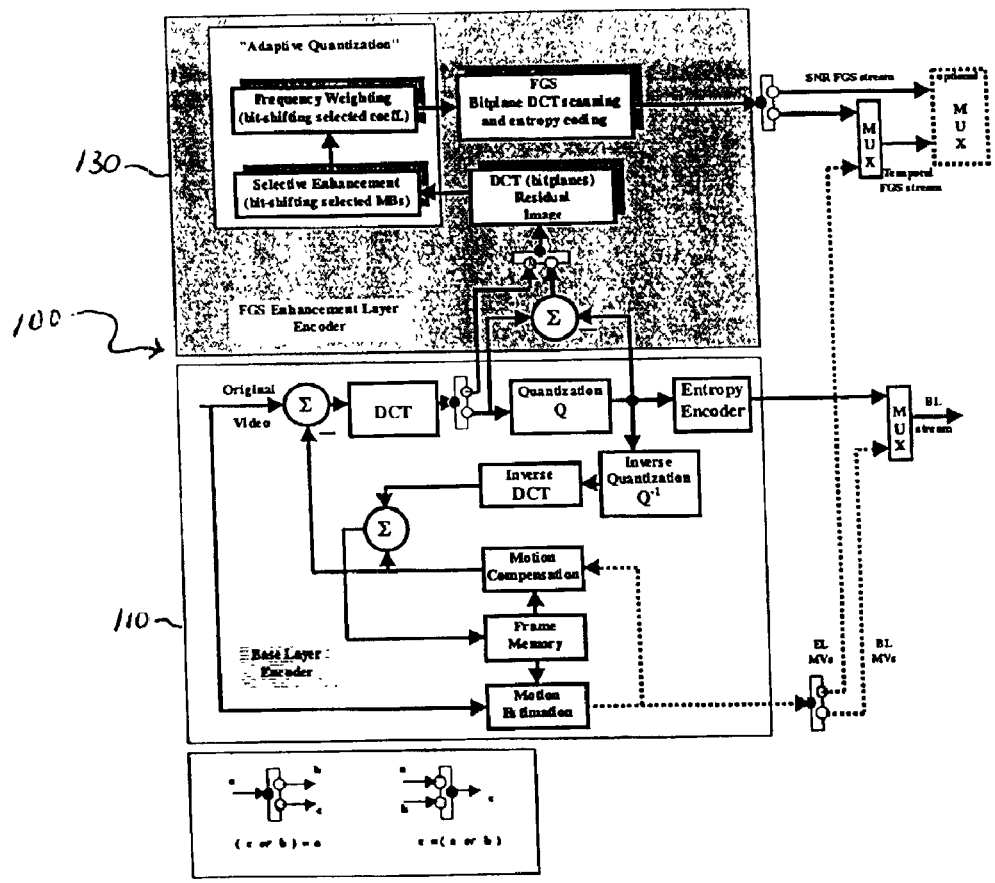
FIG. 2 is a diagram illustrating the functional architecture of an exemplary FGS hybrid temporal-SNR video encoder, which is capable of generating the scalability structures of FIGS. 1A and 1B.

Because these extended reference frames are of much higher quality, the residual motion-compensation error coded within the FGST frames is much lower than in the FGST frames of the FGS HS structures of FIGS. 1A and 1B. Hence, the FGST frames of the present invention can be more efficiently transmitted with fewer bits. The high coding efficiency of the present invention is especially useful for wireless applications, where a high coding efficiency gain is necessary.

Figure 4:
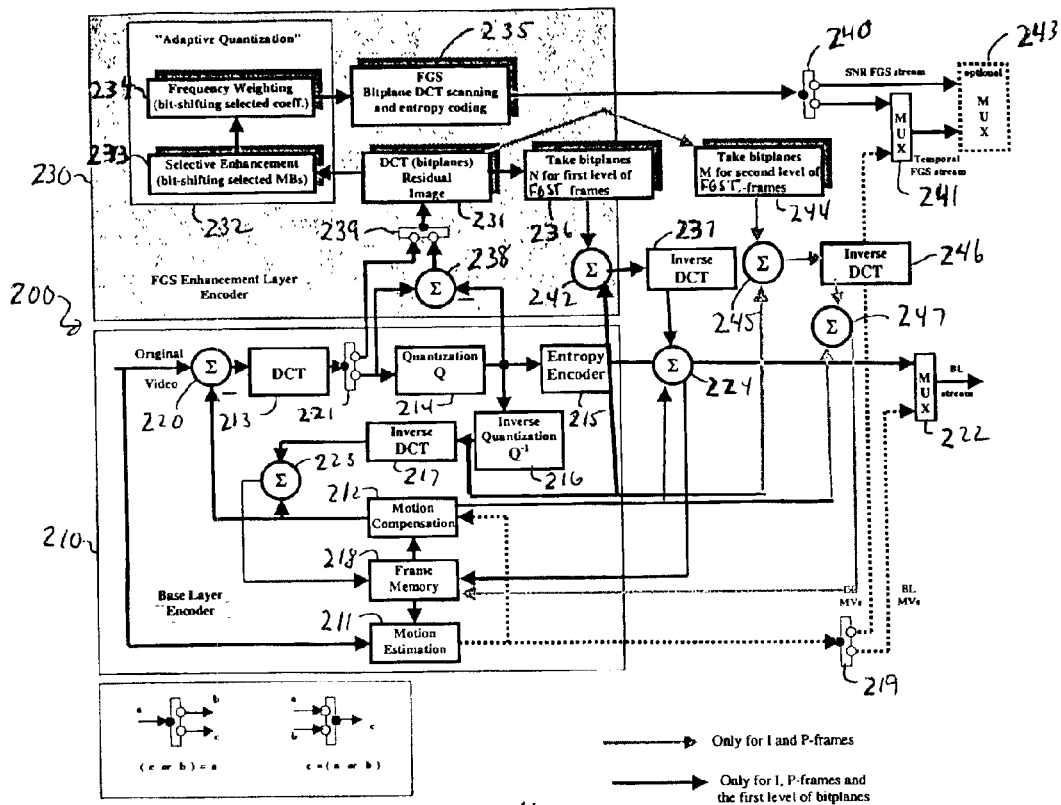
FIG. 4 is a diagram illustrating the functional architecture of an FGS hybrid temporal-SNR video encoder according to an exemplary embodiment of the present invention.

FIG. 4 illustrates the functional architecture of an FGS HS video encoder 200 according to an exemplary embodiment of the present invention. This video encoder 200 is capable of encoding a video signal in accordance with the FGS HS structures 30A, 30B of FIGS. 3A and 3B. The video encoder 200 comprises a BL encoder 210 and an EL encoder 230. The video encoder 200 receives an original video signal which is processed into a BL bit stream of I and P frames by the BL encoder 210 and into an EL bit stream of FGS SNR I and P frames and/or P and B FGST frames by the EL encoder 230. Although the encoder 200 of FIG. 4 is based on the discrete cosine transform, other transforms, such as wavelets, may be used.

The BL encoder 210 comprises a first video signal processing branch that includes a motion estimator 211, a motion compensator 212, a discrete cosine transform (DCT) 213, a quantizer 214, and an entropy encoder 215 that generates the BL bit stream. The BL encoder 210 further comprises a second video signal processing branch that includes an inverse quantizer 216, an inverse discrete cosine transform (IDCT) 217, and a frame memory 218.

The frame memory 218 is used for storing, standard BL reference frames, the extended BL reference frames, and the FGST reference frames. The motion estimator 211 receives the original video signal and estimates the amount of motion between reference frames stored in the frame memory 218 and the video frames in the original video signal, as represented by changes in pixel characteristics, and generates motion information signals that contain BL motion vectors and prediction modes (BL reference frames) or EL motion vectors and prediction modes (extended BL reference frames and the FGST reference frames). The motion information signals are applied to the motion compensator 212, and a first data-flow controller 219.

Standard BL references frame signals, the BL motion vector and prediction mode signals are utilized by the motion compensator 212 to generate motion-compensated reference frame signals that are used for predicting the standard BL P frames. The extended BL reference frame signals, the FGST reference frame signals, and the EL motion information signals for the FGST frames are utilized by the motion compensator 212 to generate motion-compensated extended BL reference frame signals and motion-compensated FGST reference frame signals that are used for predicting the first and second levels of FGST frames.

A motion-compensated residual BL P frame signal is generated at a first subtractor 220 by subtracting the standard motion-compensated BL reference frame signal from the original video signal. Motion-compensated residual FGST frame signals for producing the first level FGST frames are generated at the first subtractor 220 by subtracting the motion-compensated extended BL reference frame signal from the original video signal. Motion-compensated residual FGST frame signals for producing the second level FGST frames 35A of FIG. 3A are generated at the first subtractor 220 by subtracting a combined motion-compensated extended BL reference frame and motion-compensated extended FGST reference frame signal from the original video signal. Motion-compensated residual FGST frame signals for producing the second level FGST frames 35B of FIG. 3A are generated at the first subtractor 220 by subtracting a combined motion-compensated extended FGST reference frame signal composed of two different motion-compensated extended FGST reference frames, from the original video signal.

Motion-compensated residual FGST frame signal for producing the second level FGST frame 37 of FIG. 3B is generated at the first subtractor 220 by subtracting a motion-compensated extended BL reference frame signal from the original video signal. Motion-compensated residual FGST frame signal for producing the second level FGST frame 38 of FIG. 3B is generated at the first subtractor 220 by subtracting the motion-compensated FGST reference frame signal from the original video signal.

The DCT 213 achieves compression by conventionally transforming the spatial information in the motion-compensated residual FGST and BL P frame signals into the frequency domain. BL I frames in the original video signal are also compressed in this manner by the DCT 213. At an appropriate time, a second data-flow controller 221 routes the BL I and P frame DCT bit-plane signals generated at the output of the DCT 213 to the quantizer 214 for further compression.

The entropy encoder 215 uses conventional variable length coding or like techniques to further compress the quantized DCT bit-plane signal at the output of the quantizer 214. A first multiplexer 222 multiplexes the signal at the output of the entropy encoder 215 with the BL motion information signal which is routed to the first multiplexer 222 from the motion estimator via the first data-flow controller 219 to generate the BL bit stream of I and P frames.

The inverse quantizer 216 de-quantizes the output of the quantizer 214 to produce a signal that represents the transform input to the quantizer 214. This signal represents the reconstructed BL DCT coefficients. The IDCT 217 decodes the reconstructed BL DCT coefficients to produce a signal which provides BL I and P frame representations of the original video signal as modified by the transform and quantization processes. A first adder 223 reconstructs the BL I and P frames from the signal at the output of the IDCT 217 and the appropriate reference frame signal at the output of the motion compensator 212. These reconstructed BL I and P frames are stored in the frame memory 218 and used as the standard BL reference frames for predicting other BL P frames and the first level FGST frames.

The EL encoder 230 comprises a first video signal processing branch that includes a DCT residual image memory 231, an adaptive quantizer 232, and an FGS encoder 235. The EL encoder 230 further comprises a second video signal processing branch that includes a first bit-plane selector 236, a second IDCT 237, a second bit-plane selector 244, and a third IDCT 246.

A second subtractor 238 in the EL encoder 230 subtracts the BL DCT bit-plane signal at the output of the DCT 213 from the quantized BL DCT bit-plane signal at the output of the quantizer 214 to generate SNR DCT bit-plane residual images. At an appropriate time, a third data-flow controller 239 applies the SNR DCT bit-plane residual image signal (SNR residual signal) at the output of the second subtractor 238, or the motion-compensated first and second level FGST DCT bit-plane residual signals (FGST residual signals) routed by the second data-flow controller 221, to the DCT residual image memory 231 for storage.

The adaptive quantizer 232 is a known coding tool that improves visual quality of the transform coded video. The adaptive quantizer 232 includes a known selective enhancement tool 233 that performs selective enhancement on the SNR and FGST residual signals by bit-shifting selected macroblocks within the residual image frames, and an optional known frequency weighting tool the bit-shifts selected coefficients.

SNR residual signals at the output of the adaptive quantizer 232 are compressed by the FGS coder 235 using bit-plane DCT scanning and entropy encoding, thereby generating an FGS SNR bit-stream. A fourth data-flow controller 240 sends the FGS SNR bit-stream at an appropriate time to a third multiplexer 243. FGST residual signals at the output of the adaptive quantizer 232 are also compressed by the FGS coder 235 using bit-plane DCT scanning and entropy encoding. The compressed FGST residual signals at the output of the FGS coder 235 are sent by the fourth data-flow controller 240 at an appropriate time to a second multiplexer 241, which multiplexes the EL motion information signal routed via the first data-flow controller 219 with the compressed FGST residual signals, thereby generating an FGST bit-stream. The SNR FGS EL bit-stream and the temporal FGS bit-stream can be either multiplexed via the third multiplexer 243 to generate a single EL bit-stream (which consists of both SNR and first and second levels of temporal FGS frames) or stored/transmitted in two separate streams.

The first bit-plane selector or masking device 236 selects at least a portion of a bit-plane, i.e., a fractional bit-plane, one or more full bit-planes, or any combination of full and fractional bit-planes, of the SNR residual image signal. This data signal is combined with its corresponding BL frame signal at the output of the IDCT 216 of the BL encoder 210 at second adder 242 to construct an extended BL reference frame. The second IDCT 237 decodes the DCT coefficients of the extended BL reference frame. A third adder 224 combines the extended BL frame signal at the output of the second IDCT 237 and the appropriate reference frame signal at the output of the motion compensator 212. The extended BL frame constructed at the third adder 224 is stored in the frame memory 218 and used as the extended BL reference frame for predicting the FGST frames.

The second bit-plane selector 244, fourth and fifth adders 245 and 247, and the third IDCT 246 generate the FGST reference frames used for predicting the second level FGST frames. In the case of the second level FGST frames 35A of FIG. 3A, the second bit-plane selector 244 selects at least a portion of the reference FGST DCT bit-plane residual image 34 and at least a portion of the reference SNR DCT bit-plane residual image 33A. This data signal is combined with a corresponding BL DCT residual frame signal at the output of the IDCT 216 of the BL encoder 210 at the fourth adder 245 to construct an FGST reference frame signal for bi-directionally predicting the FGST frames 35A of FIG. 3A. This data signal is then applied to the third IDCT 246.

In the case of the second level FGST frames 35B of FIG. 3A, the second bit-plane selector 244 selects at least a portion of each of the reference FGST DCT bit-plane residual images 34. This data signal comprises an FGST reference frame signal for bi-directionally predicting the FGST frames 35B of FIG. 3A. This data signal is not processed by the fourth adder 245 and thus, is applied to the third IDCT 246.

In the case of the second level FGST frame 37 of FIG. 3B, the second bit-plane selector 244 selects at least a portion of the reference SNR DCT bit-plane residual image 33B. This data signal is combined with a corresponding BL DCT residual frame signal at the output of the IDCT 216 of the BL encoder 210 at the fourth adder 245 to construct an FGST reference frame signal for uni-directionally predicting the second level FGST frames 37 of FIG. 3B. This data signal is then applied to the third IDCT 246.

In the case of the other second level FGST frame 38 of FIG. 3B, the second bit-plane selector 244 selects at least a portion of the reference FGST DCT bit-plane residual image 36. This data signal comprises an FGST reference frame signal for uni-directionally predicting the FGST frames 38 of FIG. 3B. This data signal is not processed by the fourth adder 245 and thus, is applied to the third IDCT 246.

The third IDCT 246 decodes the DCT coefficients of the above reference frame signals. The fifth adder 247 combines the signal at the output of the third IDCT 246 and the appropriate reference frame signal at the output of the motion compensator 218. The extended FGST frames (i.e., derived from the first level FGST reference frame 34 and SNR reference frames 33A of FIG. 3A, and the first level FGST reference frame 36 of FIG. 3B) and the extended BL reference frames (i.e., derived from the first level SNR reference frame 33B of FIG. 3B) constructed at the fifth adder 247 is stored in the frame memory 218 and used as reference frames for predicting the second level FGST frames.

Figure 5:
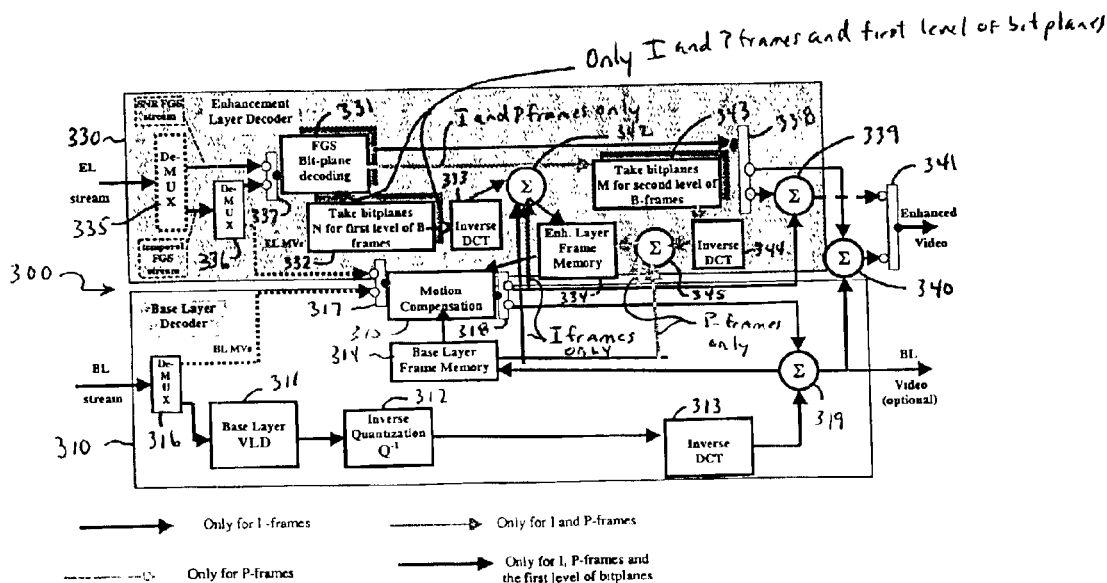
FIG. 5 is a diagram illustrating the functional architecture of an FGS hybrid temporal-SNR video decoder according to an exemplary embodiment of the present invention.

FIG. 5 illustrates the functional architecture of an FGS HS video decoder 300 according to an exemplary embodiment of the present invention. This video decoder 300 is capable of decoding the BL and EL bit-streams generated by the video encoder 200 of FIG. 4.

The video decoder 300 comprises a BL decoder 310 and an EL decoder 330. The BL decoder comprises a BL variable length decoder (VLD) 311, an inverse quantizer 311, and a first IDCT 313, a BL frame memory 314 and a motion compensator 315.

The EL decoder 330 comprises an FGS bit-plane decoder 331, a first bit-plane selector 332, a second IDCT 333, an EL frame memory 334 a second bit-plane selector 343 and a third IDCT 344. The EL decoder 330 shares the motion compensator 315 with the BL decoder 310.

The BL bit-stream is received by the BL decoder 310 and demultiplexed, via a first demultiplexer 316 to separate the coded BL information signal from the BL motion information signal. The BL VLD 311 receives the BL information signal and reverses the entropy coding process from the BL encoder 210 to produce a quantized BL DCT coefficient signal. The quantized BL information signal is inverse quantized by the inverse quantizer 312 to reconstruct the BL DCT coefficient signal. The first IDCT 313 inverse cosine transforms the BL DCT coefficient signal. The BL I frame portion of the signal at the output of the first IDCT 313 requires no further processing. Accordingly, the BL I frames at first adder 319 are stored in the BL frame memory 314.

The motion compensator 315 receives the BL motion information signal at an appropriate time, as controlled by a first data-flow controller 317. The motion compensator 315 then uses the BL motion information and the BL I and P reference frames stored in the BL frame memory 314 to reconstruct the motion-compensated BL reference frames that are used for predicting the BL P frames.

The motion-compensated BL reference frame signal at the output of the motion compensator 315 is applied to the first adder 319 at an appropriate time by the second data-flow controller 318. The first adder 319 combines this signal with the remaining portion of the signal at the output of the first IDCT 313 to reconstruct the BL P frames, which are then stored in the BL frame memory 314. The BL frame signal generated at the output of the first adder 319 may be optionally outputted as a BL video.

The EL bit-stream is received by the EL decoder 330 and is demultiplexed by a second demultiplexer 335 to separate the coded FGS SNR signal from the coded FGST signal. The coded FGS SNR signal is inputted at an appropriate time, via a third data-flow controller 337 to the FGS bit-plane decoder 331 which decodes the bit-planes of the coded FGS SNR signal by performing variable length decoding, de-shifting and inverse discrete cosine transform operations. A second adder 340 combines the decoded FGS I and P SNR frame signal at the output of the FGS bit-plane decoder 331 with the decoded BL I and P frame signal at the output of the first adder 319 at an appropriate time via a fourth data-flow controller 338. A fifth data-flow controller 341, selects an appropriate time for outputting the combined BL and SNR frame signal at the output of the first adder 319 as an enhanced video.

The first bit-plane selector 332 inputs the FGS SNR residual image or frame signal being processed by the FGS bit-plane decoder 331 prior to inverse discrete cosine transforming, and selects the previously selected number of reference bit-planes, fractional bit-planes, or the like, that were used for predicting the first level FGST frames during encoding. The second IDCT 333 performs an inverse cosine transform on the selected partially decoded reference FGS SNR bit-planes. A third adder 342 combines the fully decoded reference FGS SNR residual image or frame portions at the output of the second IDCT 333 with corresponding BL frames stored in the BL frame memory 314 to reconstruct extended BL reference frames. The extended BL reference frames are stored in the EL frame memory 334 for use later on in reconstructing the first level FGST frames.

A third demultiplexer 336 demultiplexes the FGST information signal to separate the coded FGST residual image or frame signal from EL motion information signal. The coded FGST residual image or frame signal is received by the FGS bit-plane decoder 331 at an appropriate time instance, via the third data-flow controller 337, and processed as explained immediately below.

For the bi-directionally predicted FGST frames 35A of FIG. 3A, the second bit-plane selector 332 inputs both the FGS SNR and FGST residual image or frame signals being processed by the FGS bit-plane decoder 331 prior to inverse discrete cosine transforming, and selects the previously selected number of reference bit-planes, fractional bit-planes, or the like, that were used for predicting the second level FGST frames 35A during encoding. The third IDCT 344 performs an inverse cosine transform on the selected partially decoded reference FGS SNR and FGST bit-planes. In the case of the FGS SNR bit-planes, a fourth adder 345 combines the fully decoded reference FGS SNR residual image or frame portions at the output of the third IDCT 344 with corresponding BL frames stored in the BL frame memory 314 to reconstruct extended BL reference frames for the second level FGST frames 35A. These extended BL reference frames are stored in the EL frame memory 334. In the case of the FGST bit-planes, the fourth adder serves no function and thus, the fully decoded extended FGST reference frames at the output of the third IDCT 344 are stored in the EL frame memory 334 with their corresponding extended BL reference frames for use later on in reconstructing the second level FGST frames 35A.

For the bi-directionally predicted FGST frames 35B of FIG. 3A, the second bit-plane selector 332 inputs only the FGST residual image or frame signal being processed by the FGS bit-plane decoder 331 prior to inverse discrete cosine transforming, and selects the previously selected number of reference bit-planes, fractional bit-planes, or the like, that were used for predicting the second level FGST frames 35B during encoding. The third IDCT 344 performs an inverse cosine transform on the selected partially decoded reference FGST bit-planes. The fourth adder serves no function in the case of the FGST bit-planes thus, the fully decoded extended FGST reference frames at the output of the third IDCT 344 are stored in the EL frame memory 334 for use later on in reconstructing the second level FGST frames 35B.

For the uni-directionally predicted FGST frames 37 of FIG. 3B, the second bit-plane selector 332 inputs the FGS SNR residual image or frame signal being processed by the FGS bit-plane decoder 331 prior to inverse discrete cosine transforming, and selects the previously selected number of reference bit-planes, fractional bit-planes, or the like, that were used for predicting the second level FGST frames 37 during encoding. The third IDCT 344 performs an inverse cosine transform on the selected partially decoded reference FGS SNR bit-planes. The fourth adder 345 combines the fully decoded reference FGS SNR residual image or frame portions at the output of the third IDCT 344 with corresponding BL frames stored in the BL frame memory 314 to reconstruct the extended BL reference frames for the second level FGST frames 37. These extended BL reference frames are stored in the EL frame memory 334 for use later on in reconstructing the second level FGST frames 37.

For the uni-directionally predicted FGST frames 38 of FIG. 3B, the second bit-plane selector 332 inputs only the FGST residual image or frame signal being processed by the FGS bit-plane decoder 331 prior to inverse discrete cosine transforming, and selects the previously selected number of reference bit-planes, fractional bit-planes, or the like, that were used for predicting the second level FGST frames 38 during encoding. The third JDCT 344 performs an inverse cosine transform on the selected partially decoded reference FGST bit-planes. The fourth adder serves no function in the case of the FGST bit-planes thus, the fully decoded extended FGST reference residual image or frame portions at the output of the third IDCT 344 are stored in the EL frame memory 334 for use later on in reconstructing the second level FGST frames 38.

The EL motion information signal is received by the motion compensator 315 at an appropriate time instance, via the first data-flow controller 317. The motion compensator uses the EL motion information and the extended BL and FGST reference frames stored in the EL frame memory to reconstruct the motion-compensated extended BL and FGST reference frames.

A fifth adder 339 combines the motion-compensated extended BL and FGST reference frame signal at the output of the motion compensator 315 with the decoded FGST residual frame signal at the output of the FGS decoder 331. The timing of this function is controlled by the fourth data-flow controller 338. The fifth data-flow controller 341, at an appropriate time, outputs the reconstructed FGST frame signal at the output of the fifth adder 339 as an enhanced video.

Figure 6:
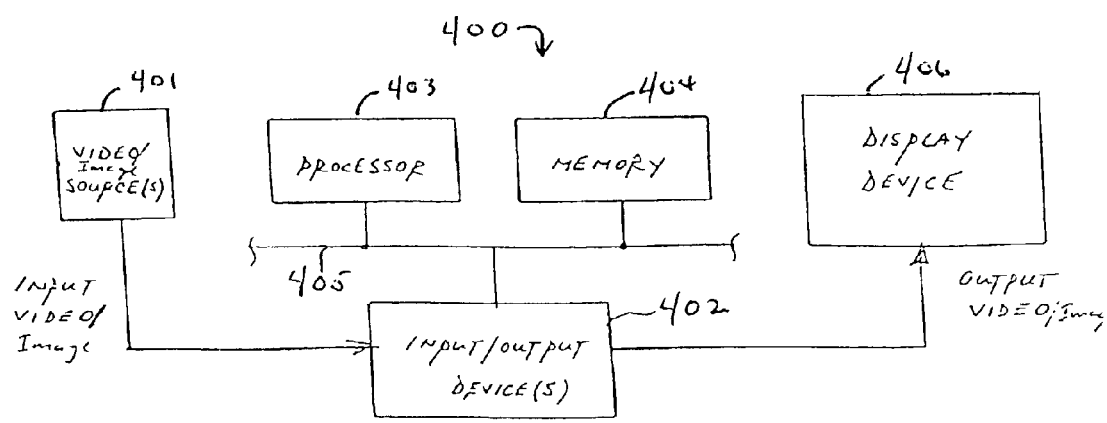
FIG. 6 illustrates an exemplary embodiment of a system which may be used for implementing the principles of the present invention.

FIG. 6 illustrates an exemplary embodiment of a system 400 which may be used for implementing the principles of the present invention. The system 400 may represent a television, a set-top box, a desktop, laptop or palmtop computer, a personal digital assistant (PDA), a video/image storage device such as a video cassette recorder (VCR), a digital video recorder (DVR), a TiVO device, etc., as well as portions or combinations of these and other devices. The system 400 includes one or more video/image sources 401, one or more input/output devices 402, a processor 403 and a memory 404. The video/image source(s) 401 may represent, e.g., a television receiver, a VCR or other video/image storage device. The source(s) 401 may alternatively represent one or more network connections for receiving video from a server or servers over, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

The input/output devices 402, processor 403 and memory 404 may communicate over a communication medium 405. The communication medium 405 may represent, e.g., a bus, a communication network, one or more internal connections of a circuit, circuit card or other device, as well as portions and combinations of these and other communication media. Input video data from the source(s) 401 is processed in accordance with one or more software programs stored in memory 404 and executed by processor 403 in order to generate output video/images supplied to a display device 406.

In a preferred embodiment, the coding and decoding employing the principles of the present invention may be implemented by computer readable code executed by the system. The code may be stored in the memory 404 or read/downloaded from a memory medium such as a CD-ROM or floppy disk. In other embodiments, hardware circuitry may be used in place of, or in combination with, software instructions to implement the invention. For example, the functional elements shown in FIGS. 4 and 5 may also be implemented as discrete hardware elements.

While the present invention has been described above in terms of specific embodiments, it is to be understood that the invention is not intended to be confined or limited to the embodiments disclosed herein. For example, other transforms besides DCT can be employed, including but not limited to wavelets or matching-pursuits. These and all other such modifications and changes are considered to be within the scope of the appended claims.

What is claimed is:

1. A method of coding video, comprising the steps of:

constructing motion-compensated extended reference frames from at least portions of first level motion-compensated residual image frames;

predicting a second level of motion-compensated residual image frames from the motion-compensated extended reference frames and the video; and fine granular scalable coding the second level motion-compensated residual image frames into a data-stream of temporal frames.

2. The method of coding video according to claim 1, further comprising the steps of:

coding the video into a data-stream of base layer frames;

computing residual image frames from the base layer frames; and fine granular scalable coding the residual image frames into a data-stream of SNR quality frames.

3. The method of coding video according to claim 2, further comprising the steps of:

constructing motion-compensated extended base layer reference frames from the base layer frames and at least portions of the residual image frames;

predicting the first level motion-compensated residual image frames from the motion-compensated extended base layer reference frames and the video; and fine granular scalable coding the first level motion-compensated residual image frames into the data-stream of temporal frames.

4. The method of coding video according to claim 3, further comprising the step of combining the data-stream of temporal frames with the data-stream of SNR quality frames to construct a single data-stream of the temporal and SNR quality frames.

5. The method of coding video according to claim 2, further comprising the step of combining the data-stream of temporal frames with the data-stream of SNR quality frames to construct a single data-stream of the temporal and SNR quality frames.

6. A method of coding a video signal, comprising the steps of:

constructing motion-compensated extended reference frames from at least portions of first level motion-compensated residual image frames;

predicting a second level of motion-compensated residual image frames from the motion-compensated extended reference frames and the video; and fine granular scalable coding the second level motion-compensated residual image frames into a data-stream of temporal frames.

7. The method of coding a video signal according to claim 6, further comprising the steps of:
coding the video into a data-stream of base layer frames;
computing residual image frames from the base layer frames; and
fine granular scalable coding the residual image frames into a data-stream of SNR quality frames.

8. The method of coding a video signal according to claim 7, further comprising the steps of:
constructing motion-compensated extended base layer reference frames from the base layer frames and at least portions of the residual image frames;
predicting the first level motion-compensated residual image frames from the motion-compensated extended base layer reference frames and the video; and
fine granular scalable coding the first level motion-compensated residual image frames into the data-stream of temporal frames.

9. The method of coding a video signal according to claim 8, further comprising the step of combining the data-stream of temporal frames with the data-stream of SNR quality frames to construct a single data-stream of the temporal and SNR quality frames.

10. The method of coding a video signal according to claim 7, further comprising the step of combining the data-stream of temporal frames with the data-stream of SNR quality frames to construct a single data-stream of the temporal and SNR quality frames.

11. An apparatus for coding video, comprising:
means for constructing motion-compensated extended reference frames from at least portions of first level motion-compensated residual image frames;
means for predicting a second level of motion-compensated residual image frames from the motion-compensated extended reference frames and the video; and
means for fine granular scalable coding the second level motion-compensated residual image frames into a data-stream of temporal frames.

12. The apparatus according to claim 11, further comprising:
means for coding the video into a data-stream of base layer frames;
means for computing residual image frames from the base layer frames; and
means for fine granular scalable coding the residual image frames into a data-stream of SNR quality frames.

13. The apparatus according to claim 12, further comprising:
means for constructing motion-compensated extended base layer reference frames from the base layer frames and at least portions of the residual image frames;
means for predicting the first level motion-compensated residual image frames from the motion-compensated extended base layer reference frames and the video; and
means for fine granular scalable coding the first level motion-compensated residual image frames into the data-stream of temporal frames.

14. The apparatus according to claim 13, further comprising means for combining the data-stream of temporal frames with the data-stream of SNR quality frames to construct a single data-stream of the temporal and SNR quality frames.

15. The apparatus video according to claim 12, further comprising means for combining the data-stream of temporal frames with the data-stream of SNR quality frames to construct a single data-stream of the temporal and SNR quality frames.

16. A memory medium for coding video, comprising:
code for constructing motion-compensated extended reference frames from at least portions of first level motion-compensated residual image frames;
code for predicting a second level of motion-compensated residual image frames from the motion-compensated extended reference frames and the video; and
code for fine granular scalable coding the second level motion-compensated residual image frames into a data-stream of temporal frames.

17. The memory medium according to claim 16, further comprising:
code for coding the video into a data-stream of base layer frames;
code for computing residual image frames from the base layer frames; and
code for fine granular scalable coding the residual image frames into a data-stream of SNR quality frames.

18. The memory medium according to claim 17, further comprising:
code for constructing motion-compensated extended base layer reference frames from the base layer frames and at least portions of the residual image frames;
code for predicting the first level motion-compensated residual image frames from the motion-compensated extended base layer reference frames and the video; and
code for fine granular scalable coding the first level motion-compensated residual image frames into the data-stream of temporal frames.

19. The memory medium according to claim 18, further comprising code for combining the data-stream of temporal frames with the data-stream of SNR quality frames to construct a single data-stream of the temporal and SNR quality frames.

20. The memory medium according to claim 17, further comprising means for combining the data-stream of temporal frames with the data-stream of SNR quality frames to construct a single data-stream of the temporal and SNR quality frames.

21. A method of decoding a base layer data-stream and an enhancement layer data-stream, which collectively represent a video, comprising the steps of:
constructing motion-compensated extended references from at least portions of first level motion-compensated residual image frames;
fine granular scalable decoding a second level temporal frame portion of the enhancement layer data-stream to construct second level of motion-compensated residual frames;
combining the motion-compensated extended reference frames with the second level motion-compensated residual frames to construct second level temporal frames.

22. The method of decoding according to claim 21, further comprising the steps of:
decoding the base layer data-stream to construct base layer frames;
fine granular scalable decoding an SNR quality frame portion of the enhancement layer data-stream to construct SNR quality frames;

constructing motion-compensated extended base layer reference frames from the base layer frames and at least portions of the SNR quality frames;

fine granular scalable decoding a temporal frame portion of the enhancement layer data-stream to construct the first level motion-compensated residual frames;

combining the motion-compensated extended base layer reference frames with the first level motion-compensated residual frames to construct first level temporal frames.

23. The method of decoding according to claim 22, further comprising the step of combining the base layer frames and the SNR quality frames into an enhanced video.

24. The method of decoding according to claim 22, further comprising the step of combining the base layer frames, the SNR quality frames, and the first and second level temporal frames into an enhanced video.

25. An apparatus for decoding a base layer data-stream and an enhancement layer data-stream, which collectively represent a video, comprising:

means for constructing motion-compensated extended references from at least portions of first level motion-compensated residual image frames;

means for fine granular scalable decoding a second level temporal frame portion of the enhancement layer data-stream to construct second level of motion-compensated residual frames;

means for combining the motion-compensated extended reference frames with the second level motion-compensated residual frames to construct second level temporal frames.

26. The apparatus according to claim 25, further comprising:

means for decoding the base layer data-stream to construct base layer frames;

means for fine granular scalable decoding an SNR quality frame portion of the enhancement layer data-stream to construct SNR quality frames;

means for constructing motion-compensated extended base layer reference frames from the base layer frames and at least portions of the SNR quality frames;

means for fine granular scalable decoding a temporal frame portion of the enhancement layer data-stream to construct the first level motion-compensated residual frames;

means for combining the motion-compensated extended base layer reference frames with the first level motion-compensated residual frames to construct first level temporal frames.

27. The apparatus according to claim 26, further comprising means for combining the base layer frames and the SNR quality frames into an enhanced video.

28. The apparatus according to claim 26, further comprising means for combining the base layer frames, the SNR quality frames, and the first and second level temporal frames into an enhanced video.

29. A memory medium for decoding a base layer data-stream and an enhancement layer data-stream, which collectively represent a video, comprising:

code for constructing motion-compensated extended references from at least portions of first level motion-compensated residual image frames;

code for fine granular scalable decoding a second level temporal frame portion of the enhancement layer data-stream to construct second level of motion-compensated residual frames;

code for combining the motion-compensated extended reference frames with the second level motion-compensated residual frames to construct second level temporal frames.

30. The memory medium according to claim 29, further comprising:

code for decoding the base layer data-stream to construct base layer frames;

code for fine granular scalable decoding an SNR quality frame portion of the enhancement layer data-stream to construct SNR quality frames;

code for constructing motion-compensated extended base layer reference frames from the base layer frames and at least portions of the SNR quality frames;

code for fine granular scalable decoding a temporal frame portion of the enhancement layer data-stream to construct the first level motion-compensated residual frames;

code for combining the motion-compensated extended base layer reference frames with the first level motion-compensated residual frames to construct first level temporal frames.

31. The memory medium according to claim 30, further comprising code for combining the base layer frames and the SNR quality frames into an enhanced video.

32. The memory medium according to claim 30, further comprising code for combining the base layer frames, the SNR quality frames, and the first and second level temporal frames into an enhanced video.

* * * * *